United States Patent
Lamboray et al.

(10) Patent No.: US 7,324,594 B2
(45) Date of Patent: Jan. 29, 2008

(54) METHOD FOR ENCODING AND DECODING FREE VIEWPOINT VIDEOS

(75) Inventors: Edouard Lamboray, Zurich (CH);
Michael Waschbüsch, Zurich (CH);
Stephan Würmlin, Zurich (CH);
Markus Gross, Uster (CH); Hanspeter Pfister, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 827 days.

(21) Appl. No.: 10/723,035

(22) Filed: Nov. 26, 2003

(65) Prior Publication Data

US 2005/0117019 A1 Jun. 2, 2005

(51) Int. Cl.
*H04N 7/12* (2006.01)
(52) U.S. Cl. ............ 375/240.03; 375/240; 375/240.01; 375/240.12
(58) Field of Classification Search ............ 375/240, 375/240.01, 240.03, 240.08, 240.12; 707/102; 382/238
See application file for complete search history.

(56) References Cited

U.S. PATENT DOCUMENTS 6,483,874 B1 * 11/2002 Panusopone et al. .. 375/240.08
6,614,936 B1 * 9/2003 Wu et al. ................. 382/238
7,203,693 B2 * 4/2007 Carlbom et al. ............ 707/102

OTHER PUBLICATIONS

Rusinkiewicz, "Qsplat: A multiresolution point rendering system for large meshes", In SIGGRAPH 2000 Conference Proceedings, ACM Siggraph Annual Conference Series, pp. 343-352, 2000.*
M. Botsch, et al., "Efficient high quality rendering of point sampled geometry," In Proceedings of the 13th Eurographics Workshop on Rendering, pp. 53-64, 2002.
H. Briceno, et al., "Geometry videos," In Proceedings of ACM Symposium on Computer Animation 2003, Jul. 2003.
A. K. Katsaggelos, et al., "Mpeg-4 and ratedistortion-based shape-coding techniques," Proceedings of the IEEE, 86(6):1126-1154, Jun. 1998.
H. Lee, et al., "Progressive encoding of complex isosurfaces," In Proceedings of SIGGRAPH 03, pp. 471-475. ACM Siggraph, Jul. 2003.

(Continued)

*Primary Examiner*—Allen Wong
(74) *Attorney, Agent, or Firm*—Dirk Brinkman; Clifton D Mueller; Gene V. Vinokur

(57) ABSTRACT

A system encodes videos acquired of a moving object in a scene by multiple fixed cameras. Camera calibration data of each camera are first determined. The camera calibration data of each camera are associated with the corresponding video. A segmentation mask for each frame of each video is determined. The segmentation mask identifies only foreground pixels in the frame associated with the object. A shape encoder then encodes the segmentation masks, a position encoder encodes a position of each pixel, and a color encoder encodes a color of each pixel. The encoded data can be combined into a single bitstream and transferred to a decoder. At the decoder, the bitstream is decoded to an output video having an arbitrary user selected viewpoint. A dynamic 3D point model defines a geometry of the moving object. Splat sizes and surface normals used during the rendering can be explicitly determined by the encoder, or explicitly by the decoder.

24 Claims, 7 Drawing Sheets

OTHER PUBLICATIONS

MPEG-3DAV, "Description of exploration experiments in 3DAV," ISO/IEC JTC1/SC29/WG11 N5700, Jul. 2003.

W. B. Pennebaker, et al., "An overview of the basic principles of the qcoder adaptive binary arithmetic coder," IBM Journal of Research and Development, 32(6):717-726, 1988.

S. Rusinkiewicz et al., "QSplat: A multiresolution point rendering system for large meshes," In SIGGRAPH 2000 Conference Proceedings, ACM Siggraph Annual Conference Series, pp. 343-352, 2000.

S. Rusinkiewicz et al., "Streaming QSplat: A viewer for networked visualization of large, dense models," In Proceedings of the 2001 Symposium on Interactive 3D Graphics, pp. 63-68. ACM, 2001.

A. Said et al., "A new fast and efficient image codec based on set partitioning in hierarchical trees," IEEE Transactions on Circuits and Systems for Video Technology, 6:243-250, Jun. 1996.

J. M. Shapiro, "Embedded image coding using zerotrees of wavelet coefficients," IEEE Transactions on Signal Processing, 41:3445-3462, Dec. 1993.

S. Vedula, et al., "Spatio-temporal view interpolation," In Proceedings of the 13th ACM Eurographics Workshop on Rendering, Jun. 2002.

S. Wuermlin, et al., "3D video fragments: Dynamic point samples for real-time free-view-point video," Computers & Graphics, Special Issue on Coding, Compression and Streaming Techniques for 3D and Multimedia Data, 28(1), 2004.

Goldlucke, B., et al. "Joint 3D Reconstruction and Background Separation in Multiple Views Using Graph Cuts," Proceedings 2003 IEEE Conference on Computer Vision and Pattern Recognition, vol. 2, pp. 683-688, Jun. 2003.

* cited by examiner

METHOD FOR ENCODING AND DECODING FREE VIEWPOINT VIDEOS

FIELD OF THE INVENTION

The present invention relates generally to video processing, and more particularly to encoding videos obtained of a moving 3D object by multiple fixed cameras, and decoding and rendering the videos from arbitrary viewpoints.

BACKGROUND OF THE INVENTION

Over the years, telepresence has become increasingly important in many applications including computer supported collaborative work (CSCW) and entertainment.

Such 3D video processing poses a major technical challenge. First, there is the problem of how a 3D video bitstream should be encoded for efficient processing, communications and storage. Second, there is the problem of extracting and reconstructing real moving 3D objects from the videos. Third, it is desired to render the object from arbitrary viewpoints.

Most prior art 3D video bitstreams are formatted to facilitate off-line post-processing and hence have numerous limitations that makes them less practicable for advanced real-time 3D video processing.

Video Acquisition

There are a variety of known methods for reconstructing objects from 2D videos. These can generally be classified as requiring off-line post-processing methods and real-time methods. The post-processing methods can provide point sampled representations, however, not in real-time.

Spatio-temporal coherence for 3D video processing is used by Vedula et al., "Spatio-temporal view interpolation," Proceedings of the Thirteenth Eurographics Workshop on Rendering, pp. 65-76, 2002. There, a 3D scene flow for spatio-temporal view interpolation is computed, however, not in real-time.

A dynamic surfel sampling representation for estimation 3D motion and dynamic appearance is also known. However, that system uses a volumetric reconstruction for a small working volume, again, not in real-time, see Carceroni et al., "Multi-View scene capture by surfel sampling: From video streams to non-rigid 3D motion, shape & reflectance," Proceedings of the 7$^{th}$ International Conference on Computer Vision," pp. 60-67, 2001. Wurmlin et al., in "3D video recorder," Proceedings of Pacific Graphics '02, pp. 325-334, 2002, describe a 3D video recorder which stores a spatio-temporal representation in which users can freely navigate.

In contrast to post-processing methods, real-time methods are much more demanding with regard to computational efficiency. Matusik et al., in "Image-based visual hulls," Proceedings of SIGGRAPH 2000, pp. 369-374, 2000, describe an image-based 3D acquisition system which calculates the visual hull of an object. That method uses epipolar geometry and outputs a view-dependent representation. Their system neither exploits spatio-temporal coherence, nor is it scalable in the number of cameras, see also Matusik et al., "Polyhedral visual hulls for real-time rendering," Proceedings of Twelfth Eurographics Workshop on Rendering, pp. 115-125, 2001.

Triangular texture-mapped mesh representation are also known, as well as the use of trinocular stereo depth maps from overlapping triples of cameras, again mesh based techniques tend to have performance limitations, making them unsuitable for real-time applications. Some of these problems can be mitigated by special-purpose graphic hardware for real-time depth estimation.

Video Standards

As of now, no standard for dynamic, free viewpoint 3D video objects has been defined. Auxiliary components of the MPEG-4 standard can encode depth maps and disparity information. However, those are not complete 3D representations, and shortcomings and artifacts due to DCT encoding, unrelated texture motion fields, and depth or disparity motion fields still need to be resolved. If the acquisition of the video is done at a different location than the rendering, then bandwidth limitations on the transmission channel are a real concern.

Point Sample Rendering

Although point sampled representations are well known, none can efficiently cope with dynamically changing objects or scenes, see any of the following U.S. Pat. No. 6,509,902, "Texture filtering for surface elements," U.S. Pat. No. 6,498,607 "Method for generating graphical object represented as surface elements," U.S. Pat. No. 6,480,190 "Graphical objects represented as surface elements," U.S. Pat. No. 6,448,968 "Method for rendering graphical objects represented as surface elements," U.S. Pat. No. 6,396,496 "Method for modeling graphical objects represented as surface elements," U.S. Pat. No. 6,342,886, "Method for interactively modeling graphical objects with linked and unlinked surface elements." That work has been extended to include high-quality interactive rendering using splatting and elliptical weighted average filters. Hardware acceleration can be used, but the pre-processing and set-up still limit performance.

Qsplat is a progressive point sample system for representing and displaying a large object. Qsplat uses a view-dependent progressive transmission technique for a multi-resolution rendering system. Static objects are represented by a multi-resolution hierarchy of point samples based on bounding spheres. Splatting is used to render the point samples. Extensive pre-processing is relied on for splat size and shape estimation, see Rusinkiewicz et al., "QSplat: A multi-resolution point rendering system for large meshes," Proceedings of SIGGRAPH 2000, pp. 343-352, 2000.

Botsch et al. use an octree data structure for storing point sampled geometry, see "Efficient high quality rendering of point sampled geometry," Proceedings of the 13$^{th}$ Eurographics Workshop on Rendering, pp. 53-64, 2002. Typical data sets can be encoded with less than five bits per point for coding tree connectivity and geometry information. When surface normals and color attributes are included, the bit requirements double or triple. A similar compression performance is achieved by a progressive encoding scheme for isosurfaces using an adaptive octree and fine level placement of surface samples, see Lee et al., "Progressive encoding of complex isosurfaces," Proceedings of SIGGRAPH 2003, ACM SIGGRAPH, pp. 471-475, July 2003.

Briceno et al. in "Geometry videos," Proceedings of ACM Symposium on Computer Animation 2003, July 2003, reorganize data from dynamic 3D objects into 2D images. That representation allows video compression techniques to be applied to animated polygon meshes. However, they cannot deal with unconstrained free viewpoint video as described below.

Vedula et al. in "Spatio-temporal view interpolation," Proceedings of the 13th ACM Eurographics Workshop on Rendering, June 2002, describe a free viewpoint video system based on the computation of a 3D scene flow and spatio-temporal view interpolation. However, they do not address the coding of the 3D scene flow representation.

Another method is described by Wuermlin et al., "3D video fragments: Dynamic point samples for real-time free viewpoint video," Computers & Graphics 28(1), Special Issue on Coding, Compression and Streaming Techniques for 3D and Multimedia Data, Elsevier Ltd, 2003, also see U.S. patent application Ser. No. 10/624,018, "Differential Stream of Point Samples for Real-Time 3D Video, filed on Jul. 21, 2003, by Würmlin et al., incorporated herein by reference. That method uses point samples as a generalization of 2D video pixels into 3D space. A point sample holds, additionally to its color, a number of geometrical attributes. The geometrical attributes guarantee a one-to-one relation between 3D point samples and foreground pixels in respective 2D video images. That method does not make any assumptions about the shape of the reconstructed object. The problem with that method is that both the encoder and decoder need to maintain a detailed 3D point model. The progressive sampling used in that system increases the complexity of the system, particularly in the decoder.

None of the prior art methods provide an efficient compression framework for an arbitrary viewpoint video of moving 3D objects.

Therefore, there still is a need for encoding multiple videos acquired of moving 3D objects by fixed cameras, and decoding the encoded bitstream for arbitrary viewpoints.

SUMMARY OF THE INVENTION

A system encodes videos acquired of a moving object in a scene by multiple fixed cameras. Camera calibration data of each camera are first determined. The camera calibration data of each camera are associated with the corresponding video.

A segmentation mask for each frame of each video is determined. The segmentation mask identifies only foreground pixels in the frame associated with the object. A shape encoder then encodes the segmentation masks, a position encoder encodes a position of each pixel, and a color encoder encodes a color of each pixel.

The encoded data can be combined into a single bitstream and transferred to a decoder. At the decoder, the bitstream is decoded to an output video having an arbitrary user selected viewpoint.

A dynamic 3D point model defines a geometry of the moving object. Splat sizes and surface normals used during the rendering can be explicitly determined by the encoder, or explicitly by the decoder.

DETAILED DESCRIPTION OF THE PREFERRED EMBODIMENT

System Structure

Figure 1:
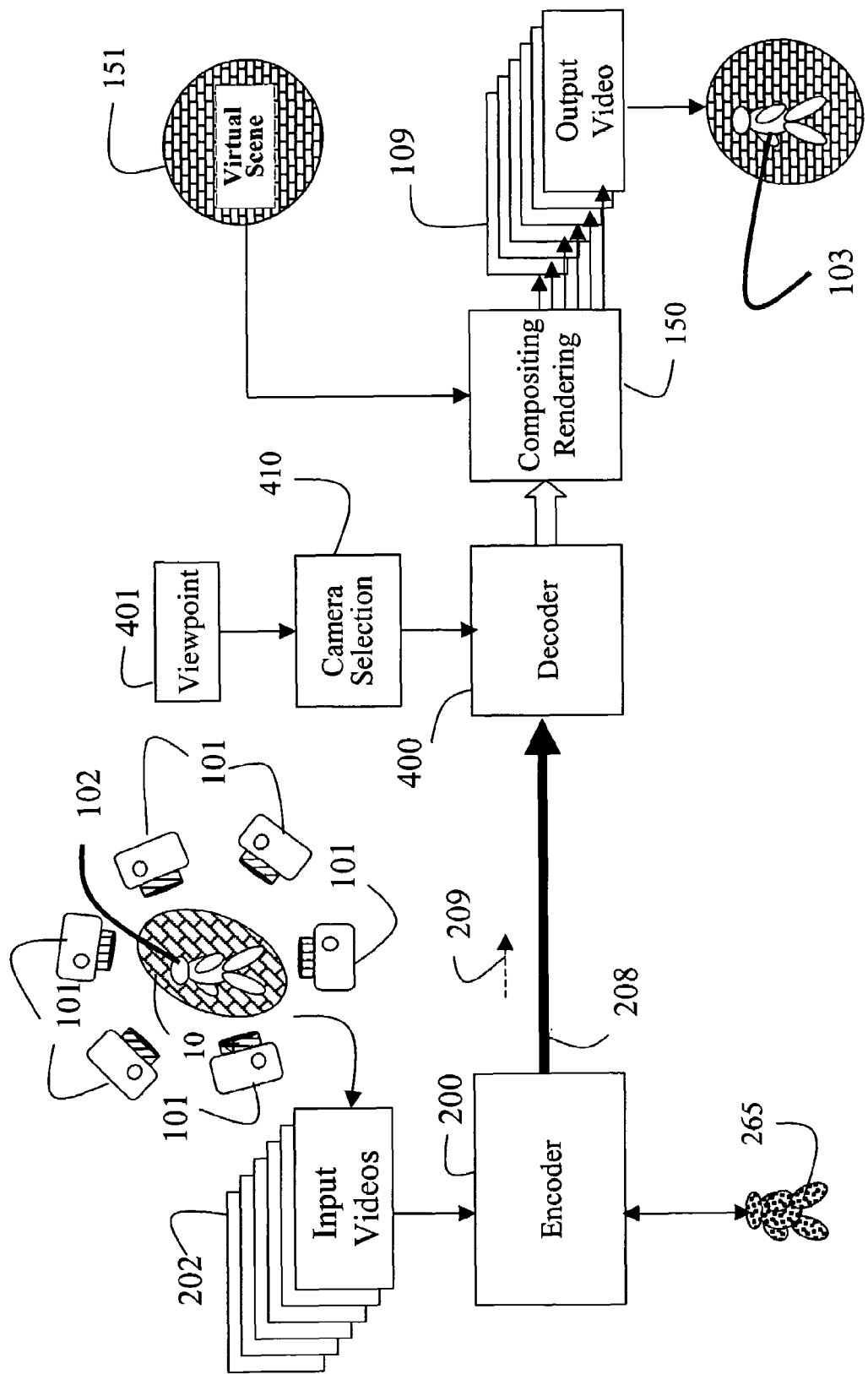
FIG. 1 is a block diagram of a system and method for encoding and decoding multiple videos acquired of moving 3D objects according to the invention.

FIG. 1 shows the general structure 100 of a system and method for encoding 200 input videos 202 and decoding 400 to output videos 109 according to our invention. Embodiment for encoding constrained and unconstrained free viewpoint videos are shown in greater detail in FIGS. 2 and 5. Constrained and unconstrained free viewpoint videos according to the invention are described in greater detail below.

As an advantage of our invention, the acquiring can be performed at a local encoding node, and the decoding at a remote decoding node. The encoding 200 can be performed as an off-line process and is not time-critical. However, the decoding 400 is done in real-time.

We used an encoded video bitstream 208. The bitstream 208 can be transferred from the encoder 200 to the decoder 400 using any conventional means, e.g., a file transfer, an intermediate storage media (DVD), a network channel, etc.

Before acquiring the videos 202, extrinsic and intrinsic parameters of synchronized cameras 101 are estimated. The calibration parameters 209 can include, for example, a projection matrix and a center of a projection vector. The encoder 200 provides the camera calibration data 209 to the decoder 400. The camera calibration data can be sent one time before the video bitstream 208 is transferred as long as the cameras remain fixed. The calibration data 209 can be updated periodically as needed should the camera parameters change due to relocating any of the cameras.

At the encoder, the multiple calibrated and synchronized cameras 101 are arranged around an object 102, e.g., a moving user. Each camera acquires an input sequence of images (input videos) 202 of the moving object 102. For example, we can use fifteen cameras around the object, and one or more above. Other configurations are possible. Each camera has a different viewpoint or 'pose', i.e., location and orientation, with respect to the object 102. This information is encoded in as part of the camera calibration data 209. It is not necessary that all cameras view the object 102 at all times. Indeed, a subset of cameras may sufficient in many cases, for example, only the cameras providing a frontal view of the object 102.

The video processing involves the following steps described in greater detail below. The videos 202 are processed to segment foreground pixels from a background portion in a scene. For this, we use silhouettes or binary segmentation masks 201, see FIG. 2. The background portion can be discarded or transferred to the decoder 400 as a single frame to form a virtual scene 151. Alternatively, the virtual scene 151 used during the video reconstruction can be generated synthetically.

It should be noted that the object 102, such as a user, can move relative to the cameras 101. The implication of this is described in greater detail below.

Given an actual rendering viewpoint 401, perhaps selected by a user in real-time, we select 410 a set of active cameras from all of the available cameras 101. The selected cameras have a 'best' view of the user 102 for the actual rendering viewpoint 401. The bitstream 208 is decoded, perhaps at a remote location, using point splatting and the arbitrary camera viewpoint 401. That is, the rendering viewpoint, at any one time, can be different from those of the cameras 101. Interpolation is used to determine pixel values for new arbitrary viewpoints. The interpolation uses images taken by cameras closest to the new viewpoints.

The decoded images 109 can be composited 150 with the virtual scene 151. We can also apply deferred rendering operations, e.g., procedural warping, explosions and beaming, using graphics hardware to maximize performance and image quality of the reconstructed object in the virtual scene.

Camera Selection at the Decoder

We use camera selection 410 at the decoder 400. The camera selection enables smooth transitions between subsets of cameras, and reduces efficiently the number of cameras required for decoding the 3D bitstream 208. The number of so-called decoding active cameras enables a smooth transition from view-dependent input videos 202 to a view-independent rendering 103 for the output video 109.

For the desired viewpoint 401, we select k cameras that are nearest to the object 102. In order to select the nearest cameras as decoding active cameras, we compare the angles of the viewing direction with the angle of all cameras 101. Selecting the k-closest cameras minimizes artifacts due to occlusions.

The multiple 2D videos 202 acquired by the synchronized cameras 101 provide the inputs to the encoder 200. Additionally, we have at our disposal for every input frame a segmentation mask 202, see FIG. 2. The masks indicate the pixels that are part of foreground or object 102.

Each foreground input pixel includes a position, a surface normal vector, a splat size, and color (texture). The simplest way to indicate position is by a depth (z) value. The position, in combination with the camera calibration data 209, define the geometry of a point model 265 of the object 102. Additional data, such as reflectance and refractive information can further describe the visual appearance of the object 102.

Constrained and Unconstrained Videos

For the output video 109, we distinguish between constrained and unconstrained free viewpoint videos. By this we mean, that an arbitrary viewpoint is selected during playback, and the viewpoint can be different than the viewpoints of any of the cameras 101 used to acquire the input videos.

In the constrained free viewpoint video, the point model 265 can be rendered from any possible viewpoint, but the viewpoint (camera) remains constant during the rendering. If discontinuities can be tolerated during the rendering, then changes in viewpoints are allowed as long as the same encoded video can be used.

In an unconstrained free viewpoint video, the point model 265 can be rendered from any possible viewpoint. During playback, the viewpoint is a function of a rendering time. Any discontinuities in rendering due to the changing viewpoints are minimized.

Figure 3:
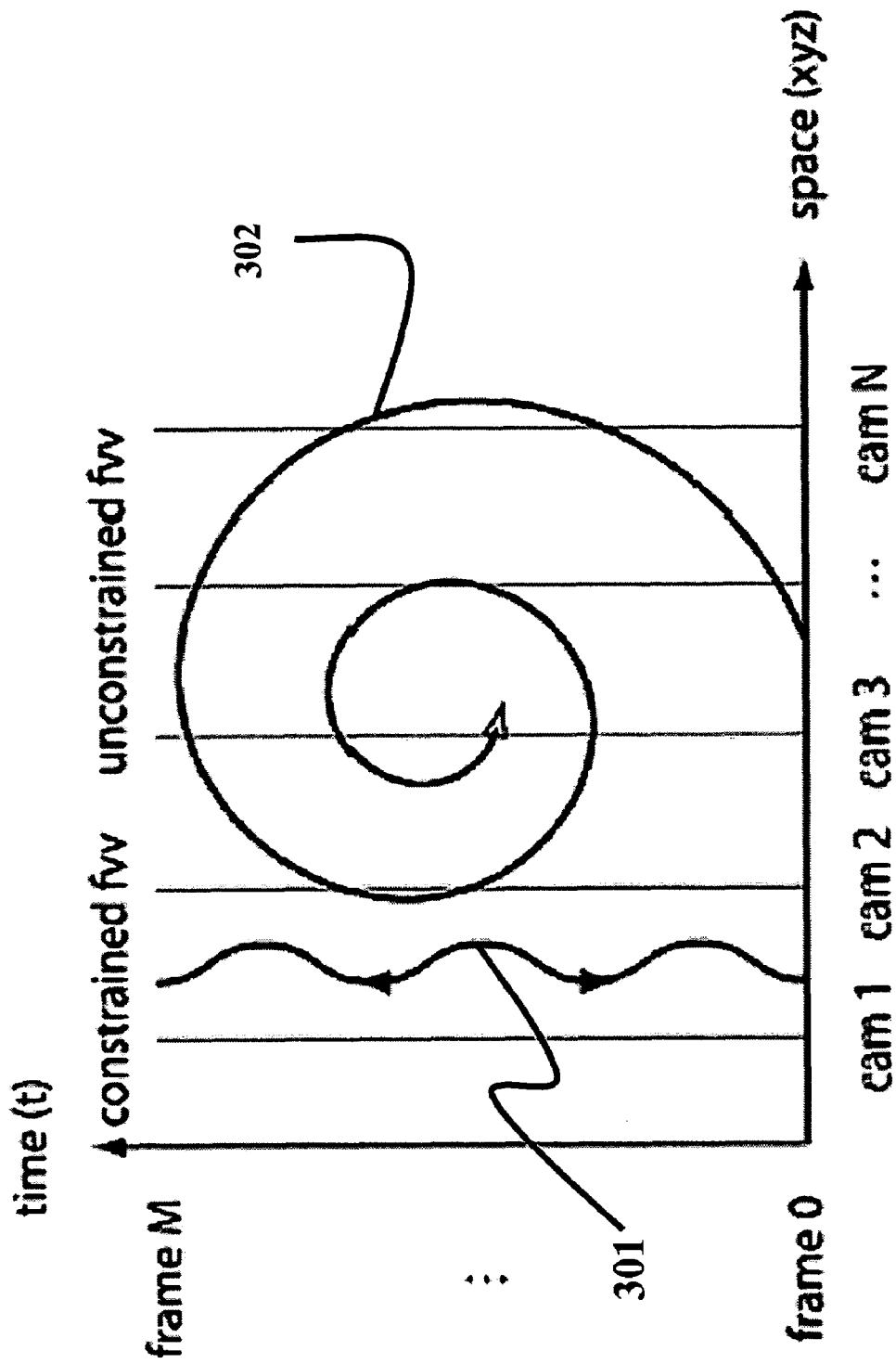
FIG. 3 is a graph of constrained and unconstrained free viewpoint trajectories.

FIG. 3 shows examples of spatio-temporal constrained and unconstrained trajectories of viewpoints. In FIG. 3, frames 0-M at time t are depicted on the y-axis, and cameras 1-N on the x-axis. In the constrained case, a trajectory 301 lies on a straight or almost straight line corresponding to a single viewpoint, although that viewpoint does not need to match the viewpoints of any of the cameras 101 used to acquire the input videos. In the unconstrained case, trajectory 302 can be arbitrary in space and time.

Taking into account that the number of cameras is potentially large and that the decoding 400 is in real-time, it is unrealistic on current hardware to first decode all videos from all cameras, and then to render the scene for a given viewpoint. Hence, it is necessary to reduce the number of videos that are decoded.

Thus, view dependent decoding is provided by the method according to the invention, using the following variables and functions:

| | |
|---|---|
| t | time of recording |
| θ | time of rendering |
| v(θ) | viewpoint as a function of the time of rendering, |
| D(v(θ), t) | set of data decoded for a viewpoint v(θ), and a time t |
| R(v(θ), t) | set of data decoded for a viewpoint v(θ)), and a time t, which becomes visible during rendering. |

$D(v(\theta), t)$ is the result after decoding and $R(v(\theta), t)$ is the result after rendering. Optimal view dependent decoding is achieved when $D(v(\theta), t) = R(v(\theta), t)$. This implies that the decoder 400, for a given decoded frame only decodes information in the corresponding recorded frame, which becomes visible in the final rendering.

In other words, D is a part of the point model 265 which is decoded, i.e., the contribution of the cameras, which are selected by the camera control at the decoder, and R is the part of the point model 265 which is rendered to an output device, i.e., the part that is visible. In that sense, R is part of an output image. Also, t is the time of recording, which is a discrete time, i.e., the camera frame numbers. The value θ is the time during rendering, i.e., the time when the user selects forward/backward, fast/normal speed playback, and an arbitrary viewpoint.

The strong condition of optimal view-dependent decoding can be relaxed using a weaker formulation for a suboptimal view dependent decoding that maximizes the intersection $D(v(\theta), t) \cap R(v(\theta), t)$. This implies that the decoder, for a given rendering image, maximizes the ratio of the decoded information of the corresponding recorded images, i.e., the decoded information used in the final rendering versus the total amount of decoded information for the given rendering image.

Application Domains

A high compression ratio is efficient when the bitstream 208 is transferred via a low bandwidth network. However, a high compression ratio increases the decoding complexity. In order to support a wide range of target output devices, e.g., cellular telephones, laptops, handheld computers, it is desired to provide a decoder with a relatively low complexity.

The problem of low bandwidth transmissions can be addressed by building upon a progressive representation of the data. In fact, bandwidth and CPU performance are often correlated, e.g. high-end computing nodes have, in general, access to a high bandwidth network connection, while computing nodes with a low bandwidth network connection generally have limited processing power.

Encoding

Therefore, the format of the bitstream 208 needs to address the following features.

Multi-resolution: Scalability and progressivity with respect to resolution. This can be achieved using either progressive encoding of the data, e.g., embedded zerotree wavelet coding (EZW), see Shapiro, "Embedded image coding using zerotrees of wavelet coefficients," IEEE Transactions on Signal Processing, 41, pp. 3445-3462, December 1993, progressive JPEG, or progressive sampling of the data, as described by Wuermlin et al. in "3D video fragments: Dynamic point samples for real-time free viewpoint video," Computers & Graphics 28(1), Special Issue on Coding, Compression and Streaming Techniques for 3D and Multimedia Data, Elsevier Ltd, 2003.

The progressive encoding is preferred over progressive sampling of Wuermlin et al. because of the lower decoding complexity.

Multi-rate: Scalability with respect to time, i.e., the playback of the output video 109 is possible at a different frame rate than the frame rate used for recording the input videos 202. Backward (reverse) playback is also possible at various speeds, see FIG. 3.

View-dependent decoding: We address the problem of encoding data for view-dependent decoding. The process for deciding which cameras are required for the view-dependent decoding of a given rendering image frame is similar to the technique described by Wuermlin et al., i.e., given the viewpoint 401 and the camera calibration data 209, we can determine the contributing cameras and decode and interpolate accordingly.

Compression

Correlation in Image Space

Similar to standard image compression algorithms, 2D transforms, such as wavelet transforms or a discrete cosine transform (DCT) can be applied to encode our input images 202.

However, we are only interested in parts of the images that depict the object 102, as indicated by the masks 201. Therefore, we use a shape-adaptive wavelet encoder.

Figure 4:
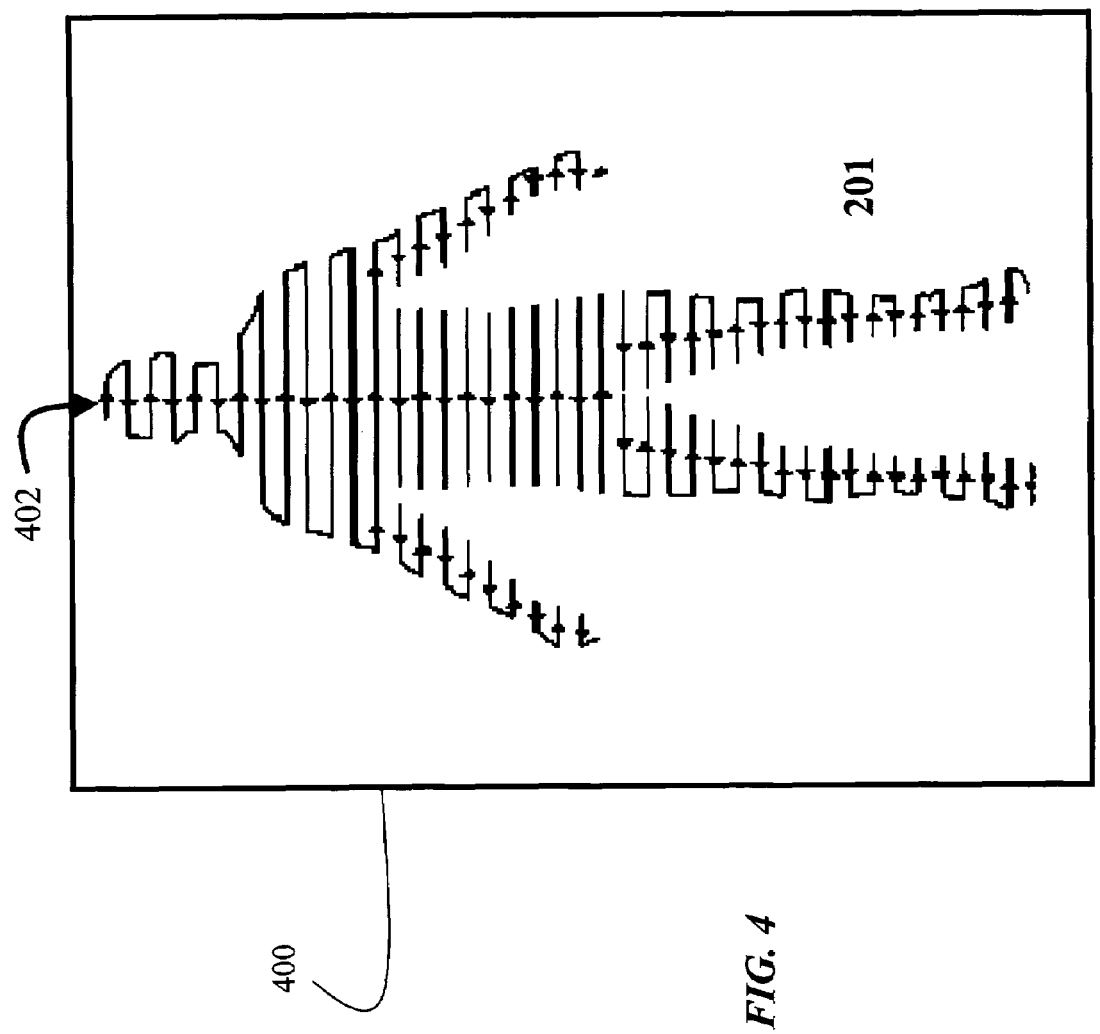
FIG. 4 is a diagram of a scan line traversal of a portion of an image inside a mask.

As shown in FIG. 4, the encoder 400 arranges the colors of the relevant pixels linearly by traversing the unmasked portion 402 of each input image 202 in a raster scan order.

Then, we apply a one-dimensional wavelet transform to this list to obtain wavelet coefficients. We do this with a lifting scheme, see Sweldens, "The lifting scheme: A custom-design construction of biorthogonal wavelets," Applied and Computational Harmonic Analysis, 3(2): 186-200, 1996. The wavelet coefficients are encoded finally by a zerotree coder, and further compressed by arithmetic encoding see Said et al., "A new fast and efficient image codec based on set partitioning in hierarchical trees," IEEE Transactions on Circuits and Systems for Video Technology, 6:243-250, June 1996, Shapiro, "Embedded image coding using zerotrees of wavelet coefficients," IEEE Transactions on Signal Processing, 41:3445-3462, December 1993, and Rissanen et al., Arithmetic coding. IBM Journal of Research and Development, 23(2), pp. 149 -162, 1979.

The progressive behavior of both the zerotree and arithmetic coder permits a lossy compression up to a desired bit rate or distortion. Furthermore, the encoders enable progressive transmission and partial decompression of the coded bitstream 208 during playback of the video. The decoder 400 is also provided with the lossless silhouette mask 201 of the current frame to be able to reconstruct the scan order used during the encoding.

Correlation in the Time Dimension

We first consider the case of the constrained free viewpoint video. In most cases, the video is played back with increasing time t and at a normal playback speed. Hence, we use the information from previous frames to construct a current frame. A first frame in a segment is a key frame, and following frames in the segment are encoded as difference frames. Each difference frame indicating a change between the current frame and previous frames.

For each camera i, a decoding function $c_i(t)$ returns a contribution to the 3D point model of the respective camera at time t. If a temporal correlation is exploited by using the information from previous frames, then the decoding function has a form $$c_i(t)=c_i(t')+\Delta c_i(t) \quad (1)$$

with t'<t, and where $\Delta c_i(t)$ describes the specific contribution of frame t.

Note that most 2D video coding methods are of the form expressed by equation (1). This approach is also feasible for the constrained free viewpoint output video according to the invention.

In the case of the unconstrained free viewpoint video, it is more difficult to exploit temporal correlation. The decoder is required to implement a function f, which returns a 3D point model for any time instant θ during the observation. This implies a viewpoint v(θ) and a mapping function m(θ), which maps the rendering time to the recording time.

For a viewpoint v, a weight function w(v) indicates the cameras that contribute to a visible part of the 3D point model. In a first approximation, we can assume that w(v) returns 1 when a camera has a visible contribution, and 0 if not.

We obtain $$f(v(\theta), t) = w(v(\theta)) \cdot f(t)$$
$$= [w_0(\theta) \ldots w_{NI}(\theta)] \cdot \begin{bmatrix} c_0(t) \\ \ldots \\ c_{NI}(t) \end{bmatrix}.$$

Assume $\theta'=m^{-1}(t')$ and $t \neq t'$. The decoding of $c_i(t)$ requires the decoding of $c_i(t')$. However, if $w_i(\theta')=0$, the condition of view-dependent decoding is violated. Hence, optimal view-dependent decoding can only be implemented using decoders defined as $$c_i(t)=C_i+\Delta c_i(t),$$

with $C_i$ representing a time independent base representation.

Thus, the decoder for the constrained viewpoint video needs to implement decoding in constant time for frames accessed in a random order.

Compression Framework

Figure 2:
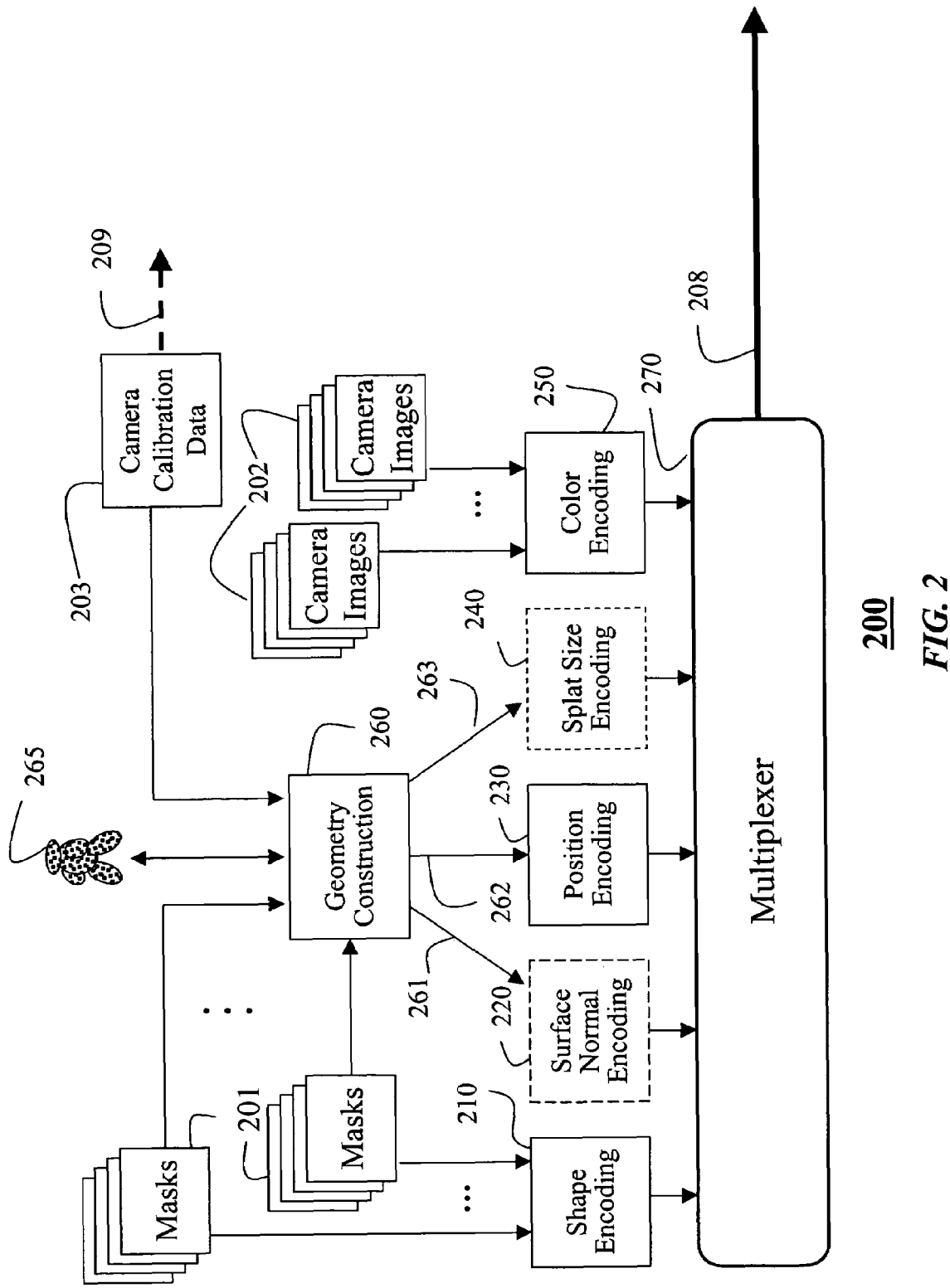
FIG. 2 is a block diagram of an encoder used by the system of FIG. 1.

FIG. 2 shows the basic system structure 200 for encoding a video according to the invention. The system includes the following encoding modules: a shape encoder 210, a surface normal encoder 220, a position encoder 230, a splat size encoder 240, and a color (texture) encoder 250. The system also includes a geometry construction module 260, and a multiplexer 270.

It should be noted, that the decoder 400 includes a complementary decoding module for each of the encoding modules. The construction of each decoder is self-evident from the construction of the corresponding encoder described in detail herein.

The inputs to the system are segmentation masks 201, camera images 202, and camera calibration data 203. The segmentation masks are obtained from the camera images using any known binary segmentation procedure. The segmentation masks 201 are used to obtain only the foreground (object) pixels to be encoded. Therefore, there is one mask for each camera image. Only the foreground pixels in the camera images 202 define the object 102 in the scene.

We use a lossless encoding for the segmentation masks 201 to avoid shifts and wrong associations between model points and their attributes. The segmentation masks are available to both the encoder and the decoder.

The underlying data representation for our video format is the dynamic 3D point model 265. In the point model, each point has a set of attributes. Because the point attributes are stored and compressed separately, a reference scheme is used. The reference scheme allows for the unique identification between points and their attributes. The camera images 202 are used to build the point model 265. There is an identified sequence of images for each camera. Each point is identified uniquely by its 2D position in image space and an identifier of one or more cameras. We consider only foreground pixels in each image to build the 3D point model.

Pixel attributes can be encoded using a lossy compression scheme. Nevertheless, a lossless or almost lossless decoding is possible when all data are available to the decoder 400.

The bitstream 208 finally consists of encoded key frames and encoded difference frames. The difference frames rely upon a prediction based on a most recent key frame, e.g., frame 0 is the key frame, frame 1 is a difference frame based on frame 0, frame 2 is a difference frame based on frame 1 and frame 0, and so forth.

From the segmentation masks 201 and the camera calibration data 209, a geometric reconstruction of the object of interest in the scene is determined. The output of the geometric reconstruction are surface normal vectors 261, 3D positions 262, and surface splat sizes 263.

The outputs of the encoders are sent to the multiplexer 270. The output of the multiplexer are combined into the encoded video bitstream 208. The camera calibration data 209 need only be sent once to the decoder as long as the cameras 101 remain fixed in place. These parameters can be sent before the start of streaming the video 208. The parameters can be sent using any conventional technique, for example as part of a preamble of the bitstream 208, or on a side channel.

Video Encoding

Constrained Video Encoding

Shapes

The shape encoder 210 can use MPEG-4 lossless binary shape encoding, see Katsaggelos et al., "MPEG-4 and rate/distortion-based shape-coding techniques," Proceedings of the IEEE, 86(6), pp. 1126-1154, June 1998.

Surface Normals

The surface normal vectors are progressively encoded using an octahedron subdivision of a unit sphere, see Botsch et al., "Efficient high quality rendering of point sampled geometry," Proceedings of the 13$^{th}$ Eurographics Workshop on Rendering, pp. 53-64, 2002. Two byte codewords are represented in two gray scale MPEG video objects. For most applications, the precision of one byte encoded normals is sufficient.

Positions

The x and y coordinates of each point are inherently known from the image pixels and camera calibration data. Therefore, it is sufficient to just encode the depth (z) values. Disparity encoding can be done with MPEG-4 video object coding, where the depth values are quantized as pixel luminance or intensity values.

Splat Sizes

The splat sizes are quantized to one byte and the codewords are represented in a gray scale MPEG video object.

Colors

The color coding can use conventional MPEG-4 video object coding in the 4:1:1 YUV format, see Ostermann et al., "Coding of arbitrarily shaped video objects in MPEG-4," Proceedings of the International Conference on Image Processing," pp. 496-499, 1997. However, our encoder 200 is also capable of handling texture data in other formats.

The complete decoding 400 of one constrained video frame requires for each reconstruction view a gray scale MPEG video objects for depth, surface normal, and splat size, and one color video object.

Unconstrained Video Encoding

Figure 5:
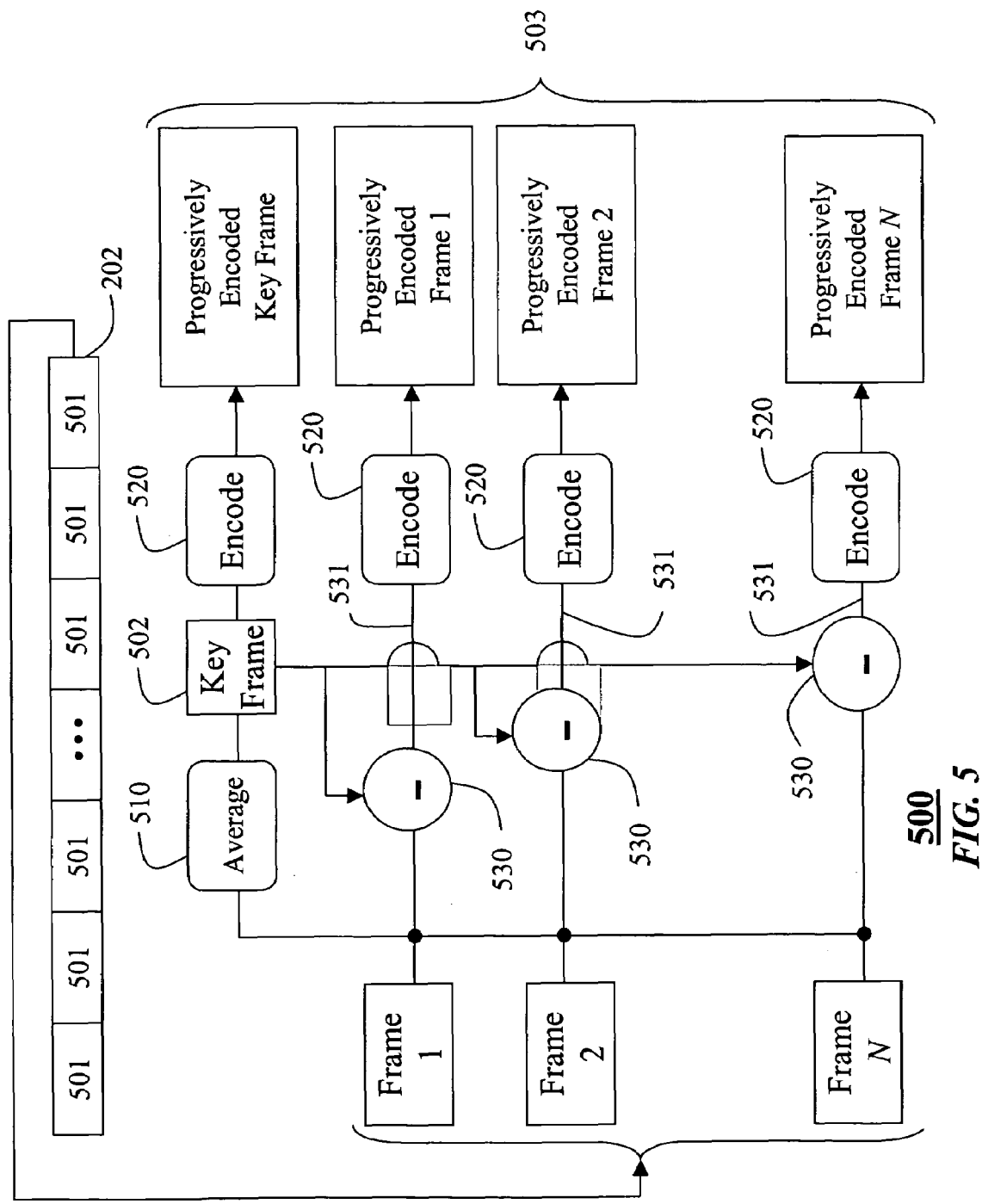
FIG. 5 is a block diagram of an encoder for an unconstrained video.

FIG. 5 shows an encoder 500 for one attribute of an unconstrained free viewpoint video. In this case, each video 202 is processed as segments 501 of N frames.

First, a key frame 502 is constructed. In this case, the key frame is an average 510 of the N frames in each segment 501, instead of just the first frame of the segments as in the constrained case. The average can e.g. be the mean or the median value.

The key frame is progressively encoded 520.

Then, a difference 530 is determined between the key frame 501 and each frame of the segment. The difference frames 531 are likewise encoded 520. This produces N+1 encoded frames 503. If the value of N is relatively large, for example a hundred or more, then the additional cost of encoding the averaged key frame is marginal for the unconstrained case when compared with the constrained case of N frames.

Figure 6:
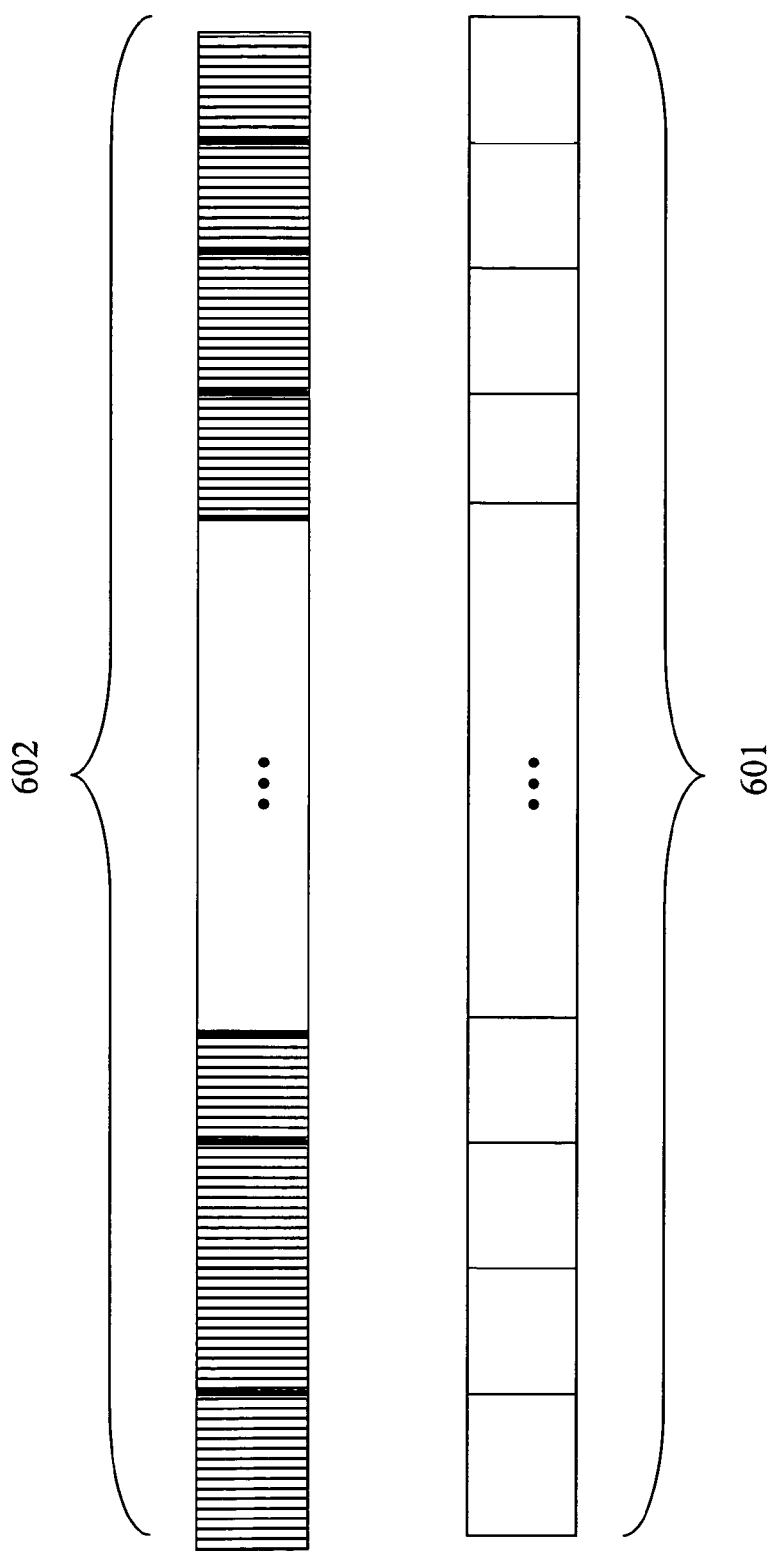
FIG. 6 is block diagram of a base layer and an enhancement layer encoded as a video bitstream according to the invention.

As shown in FIG. 6, the encoded video bitstream 208 thus comprises a base layer 601 which contains the averaged encoded key frames, and an enhancement layer 602 composed of the encoded difference frames.

Figure 7B:
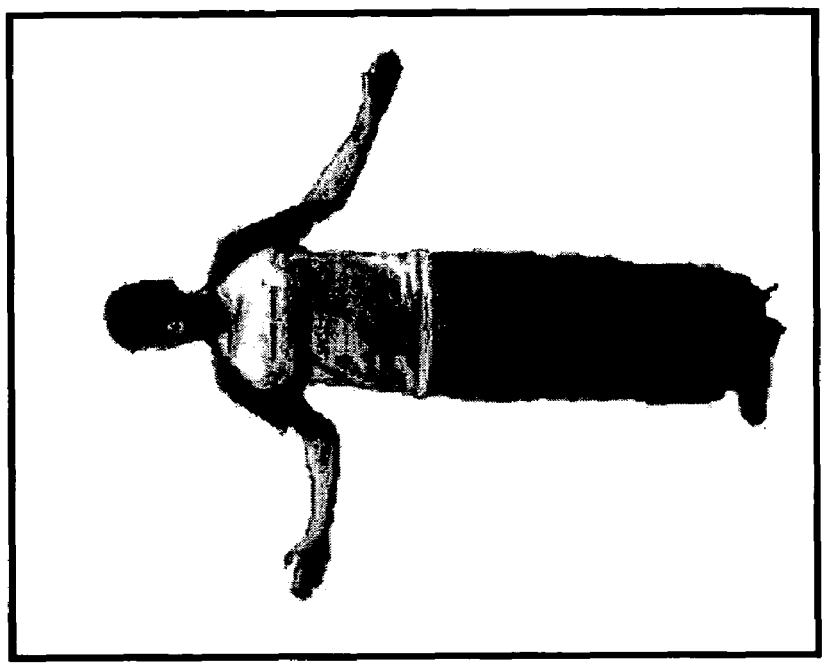
FIG. 7B is an images reconstructed from the key frame of FIG. 7A.
Figure 7A:
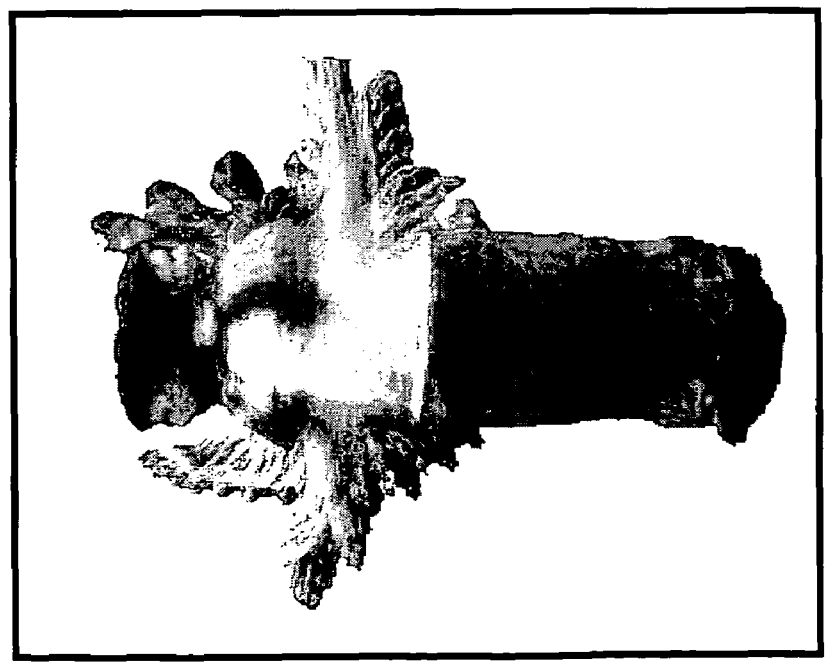
FIG. 7A is a key frame according to the invention.

FIG. 7A shows a key frame obtained by averaging a segment of a video showing a person turning in a circle. FIG. 7B show the reconstruction for one frame of the segment.

Unconstrained Coding

Shape Coding

Shape encoding can be done with lossless JBIG or MPEG-4 binary shape encoding for the segmentation mask.

Key frame: Those pixels that are foreground pixels in more than half of the frames of the segment 501 are foreground pixels in the key frame 502.

Difference frame: The difference of the current frame with respect to the key frame.

Attributes

All point attributes are encoded using the average encoding scheme 500. That is, the attributes of the key frame in the unconstrained case are obtained from an average of all frames in the segment, while the attributes of the key frame in the constrained case come only from the first frame.

Key frame: Averaged attributes of the segment.

Difference frame: Difference with respect to the key frame.

Now, we describe how the different attributes are represented.

Disparity Encoding

Color Encoding: Embedded zerotree wavelet encoding.

Surface Normal Encoding: The surface normal vectors are progressively encoded using the octahedron subdivision of the unit sphere. The two-byte codewords are then represented in two luminance images which are independently compressed using EZW.

Splat Sizes: The splat sizes are quantized on a gray scale image.

For large segments 501, the extra cost of decoding the key frames is small. The complexity is about the same as for the unconstrained method. For each reconstruction camera, we have one binary shape image, four gray scale images, and one color image.

Multiplexing

Because all attributes are encoded independently and progressively, a stream satisfying a given target bit rate can be composed by multiplexing the individual attribute bitstreams into one bitstream for transfer. Appropriate contributions of the single attribute bitstreams are determined according to desired rate-distortion characteristics.

For example, a bitstream of 300 kilobits per second contains 30 kb/s of shape information, 60 kb/s of position information, 120 kb/s of color information, 45 kb/s of surface normal information and 45 kb/s of splat size information.

Extension to Entire Dynamic 3D Scenes

The encoders, described so far for video objects, can also be used to encode entire dynamic scenes. Distinct objects in the scene can be encoded in different layers. Static objects are described by a single key frame. A scene graph, which is stored as side information, describes the spatial relations between the different layers. View dependent decoding is again enabled by decoding only those layers which are visible from the current arbitrary viewpoint 401.

Dynamic Point Sample Processing and Rendering

We perform decoding and rendering in real-time. The compositing 150 combines decoded images with the virtual scene 151 using Z-buffering. We can also provide for post-processing operations, such as 3D visual effects, e.g., warping, explosions and beaming, which are applicable to the real-time 3D video stream, without affecting the consistency of the data structure.

Furthermore, it is possible to estimate splat sizes and surface normals from the positions of the decoded point samples only. This estimation can be performed in real-time during the rendering process. In that case, the surface normal encoder 220 and splat size encoder 240 are not required, and storage or transfer of splat sizes and surface normals is unnecessary.

Point Sample Rendering

We render the point samples as polygonal splats with a semi-transparent alpha texture using a two-pass process. During the first pass, opaque polygons are rendered for each point sample, followed by visibility splatting. The second pass renders the splat polygons with an alpha texture. The splats are multiplied with the color of the point sample and accumulated in each pixel. A depth test with the Z-buffer from the first pass resolves visibility issues during rasterization.

View-Dependent Rendering

To render a particular point, we use a selected set of k decoding active cameras. However, this may produce transition artifacts when the set of active cameras changes during the trajectory of the viewpoint. Therefore, the contribution of each camera to the rendering is weighted by the angle between its viewing direction and the direction of the current viewpoint 401. In order to achieve a smooth transition, we subtract the weight of the closest inactive camera so that only the active cameras have a positive contribution.

For the current viewpoint, we render k separate images of the scene, each time using only the points from one different active camera. Finally, the images are combined by blending the point splats using alpha values according to the computed camera weights.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for encoding a plurality of videos acquired of a moving object in a scene by a plurality of fixed cameras, comprising:
    means for determining camera calibration data of each camera of a plurality of cameras;
    means for concurrently acquiring a plurality of videos of the 3D moving object in a scene with the plurality of cameras, in which there is one video acquired by each camera;
    means for associating the camera calibration data of each camera with the video acquired by the camera;
    means for determining a segmentation mask for each frame of each video, the segmentation mask identifying only pixels in the frame associated with the moving object;
    a shape encoder configured to encode the segmentation masks;
    a position encoder configured to encode a 3D position of each pixel;
    a color encoder configured to encode a color of each pixel; and
    means for combining the encoded segmentations masks, pixel positions and colors of the pixels to form a 3D bitstream representing the moving object.

2. The system of claim 1, further comprising:
    a multiplexer configured to combine outputs of the shape encoder, the position encoder, and the color encoder into a single 3D bitstream.

3. The system of claim 2, further comprising:
    a decoder;
    means for transferring the bitstream to the decoder; and
    rendering a decoded bitstream from an arbitrary viewpoint using the camera calibration data.

4. The system of claim 3, in which the arbitrary viewpoint is constrained in space.

5. The system of claim 3, in which the arbitrary viewpoint is unconstrained in space.

6. The system of claim 1, further comprising:
    means for maintaining a dynamic 3D point model defining a geometry of the moving object.

7. The system of claim 1, in which each point of the dynamic 3D point model is associated with an identifier of one or more of the plurality of cameras.

8. The system of claim 1, in which the encoded segmentation masks are compressed using a lossless compression, and the position and the colors are encoded using a lossy compression.

9. The system of claim 8, in which the lossy compression scheme is a progressive encoding using embedded zerotree wavelet coding.

10. The system of claim 1, in which the camera calibration data are updated periodically when any of the fixed cameras are relocated.

11. The system of claim 1, in which the segmentation masks are encoded using MPEG-4 lossless binary shape encoding, the positions include depth values encoded as quantized pixel luminance values, and the colors are encoded using MPEG-4 video object coding.

12. The system of claim 1, in which the entire scene is encoded using a scene specifying relations between static and dynamic portions of the scene.

13. The system of claim 1, further comprising:
    a decoder configured to decode the encoded segmentation masks, the encoded positions, and the encoded colors as an output video having an arbitrary viewpoint using the camera calibration data.

14. The system of claim 13, in which the arbitrary viewpoint is different than a viewpoint of any of the cameras.

15. The system of claim 13, in which images of the output video are composited with a virtual scene.

16. The system of claim 13, in which a playback frame rate of the output video is different than a frame rate used to acquired the videos by the plurality of cameras.

17. The system of claim 13, in which splat sizes and surface normals are estimated from the positions.

18. The system of claim 1, in which the shape encoder uses MPEG-4 lossless binary shape encoding, the position encoder encodes depth values, and the color encoder uses MPEG-4 video object coding.

19. The system of claim 1, further comprising:
means for partitioning each video into a plurality of segments, each segment including a plurality of frames; and
means for encoding a key frame and difference frames of each segment, using the shape encoder, the position encoder, and the color encoder into a single bitstream.

20. The system of claim 19, in which the key frames comprise a base layer of an encoded video bitstream, and the difference frames comprise an enhancement layer of the encoded bitstream.

21. The system of claim 19, further comprising:
means for averaging the frames in each segment to construct the key frame;
means for determining the difference frame for each frame in the segment from the key frame and the frame.

22. The system of claim 19, in which the key frame is a first frame of the segment, and a difference frame is determined from a current frame and previous frames in the segment.

23. The system of claim 1, further comprising:
a surface normal encoder configured to encode a surface normal of each pixel; and
a splat size encoder configured to encode a splat size for each pixel; and
means for combining the outputs of the surface normal encoder and the splat size encoder with the single bitstream.

24. The system of claim 23, in which the surface normal vectors are progressively encoded using an octahedron subdivision of a unit sphere and the splat sizes are encoded as quantized codewords represented in a gray scale MPEG video object.

* * * * *